Figure 1:
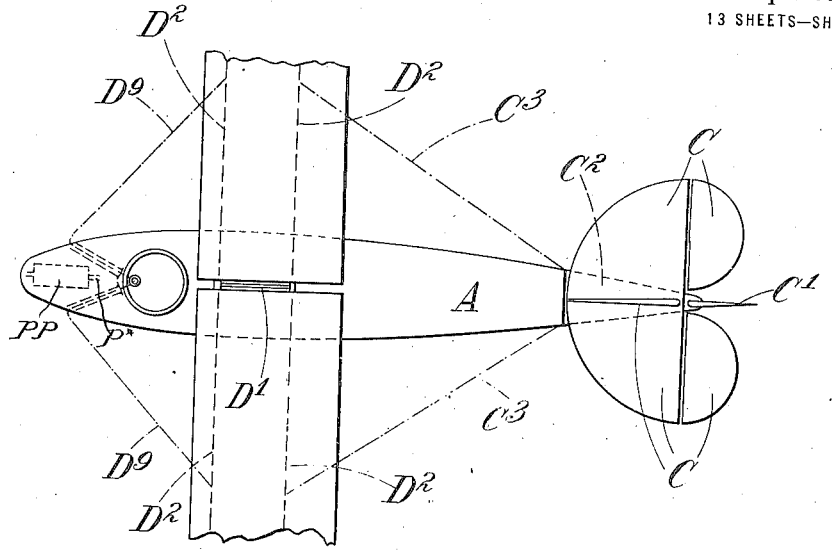

N. P. BILLING.
FLYING BOAT OR OTHER AERIAL CRAFT.
APPLICATION FILED JULY 7, 1914.

1,180,967.

Patented Apr. 25, 1916.
13 SHEETS—SHEET 1.

N. P. BILLING.
FLYING BOAT OR OTHER AERIAL CRAFT.
APPLICATION FILED JULY 7, 1914.
1,180,967.
Patented Apr. 25, 1916.
13 SHEETS—SHEET 3.
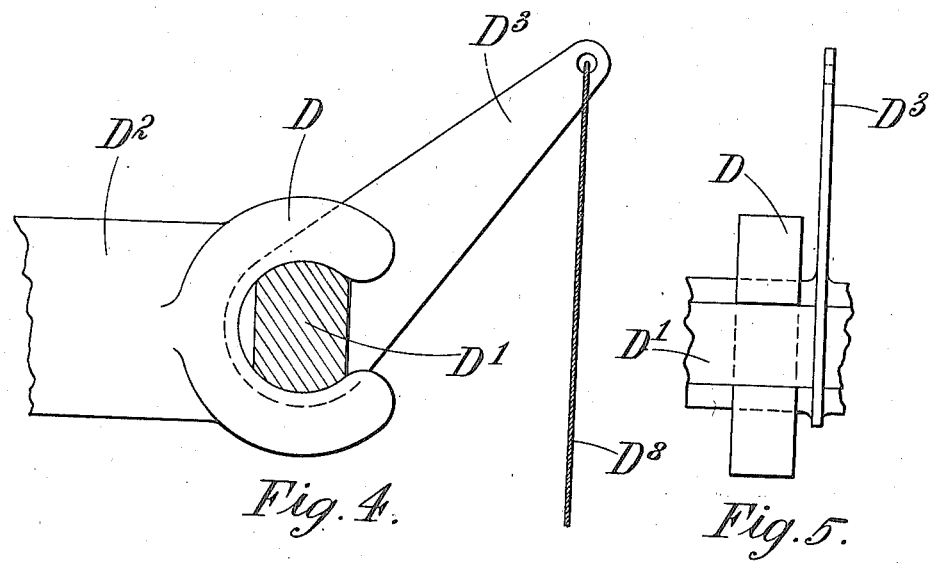
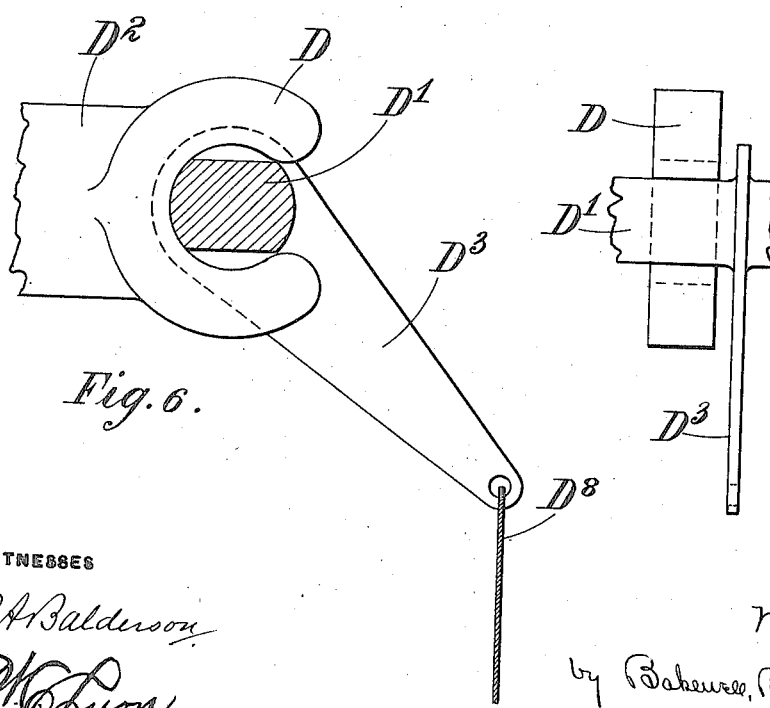

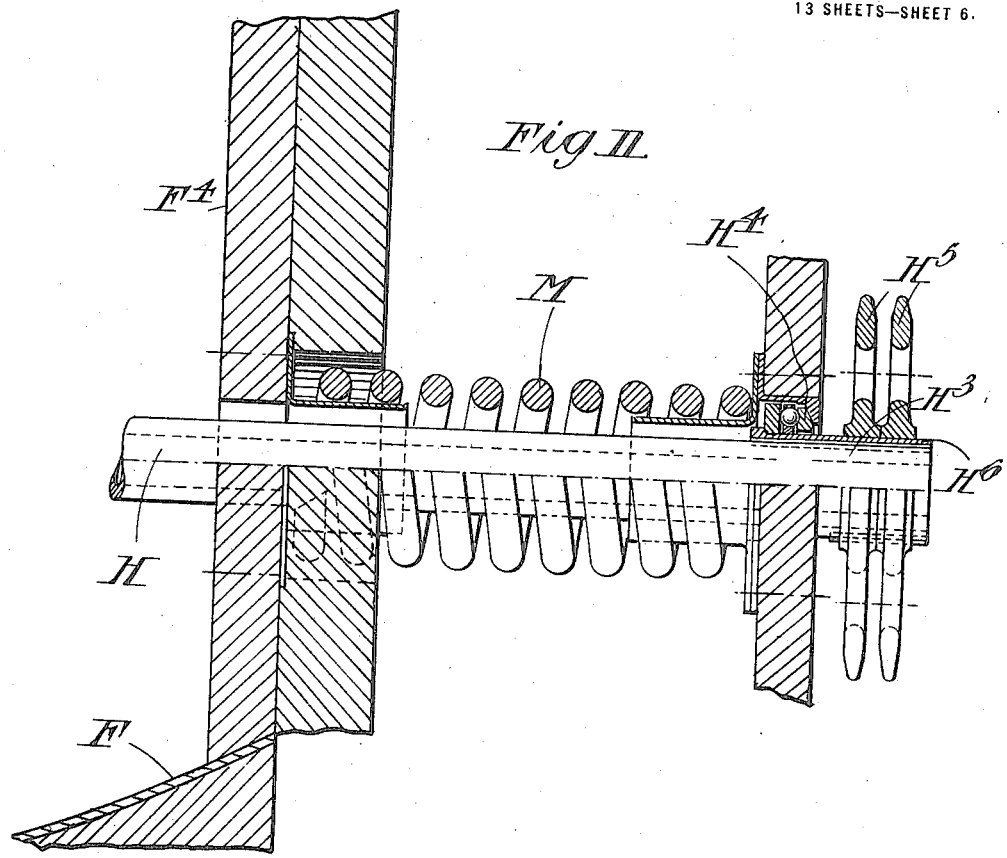
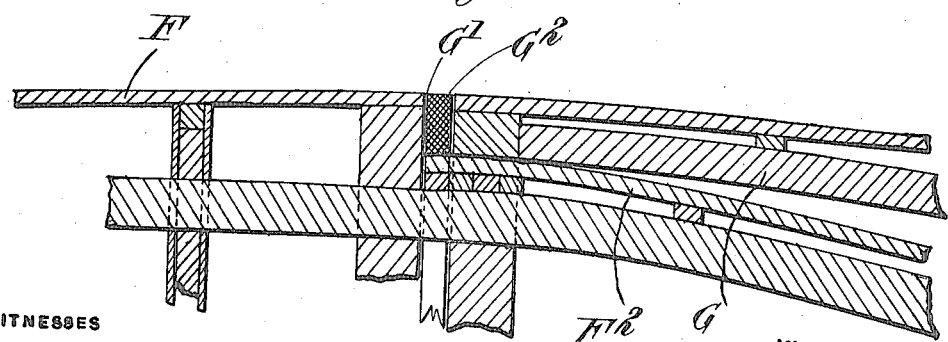

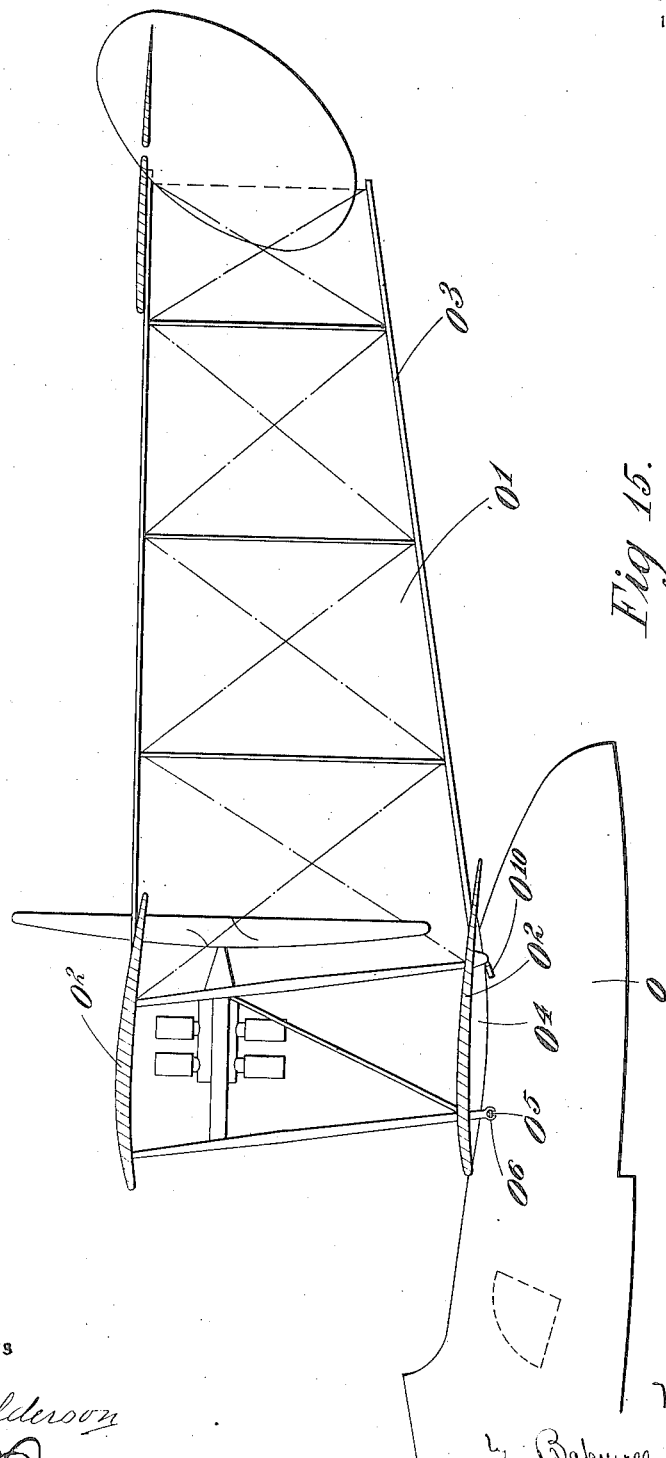

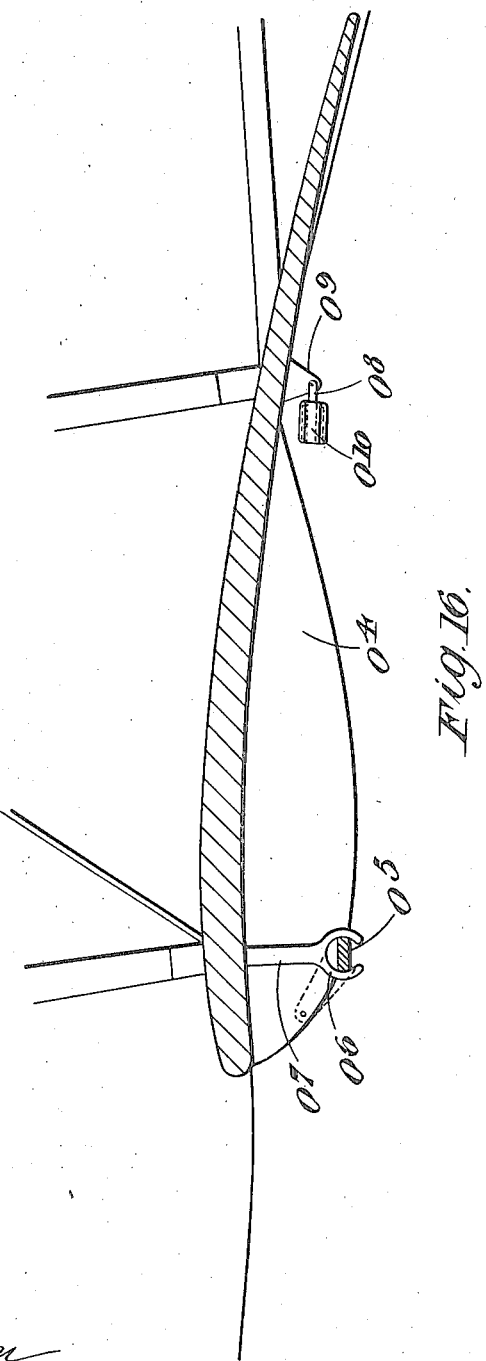

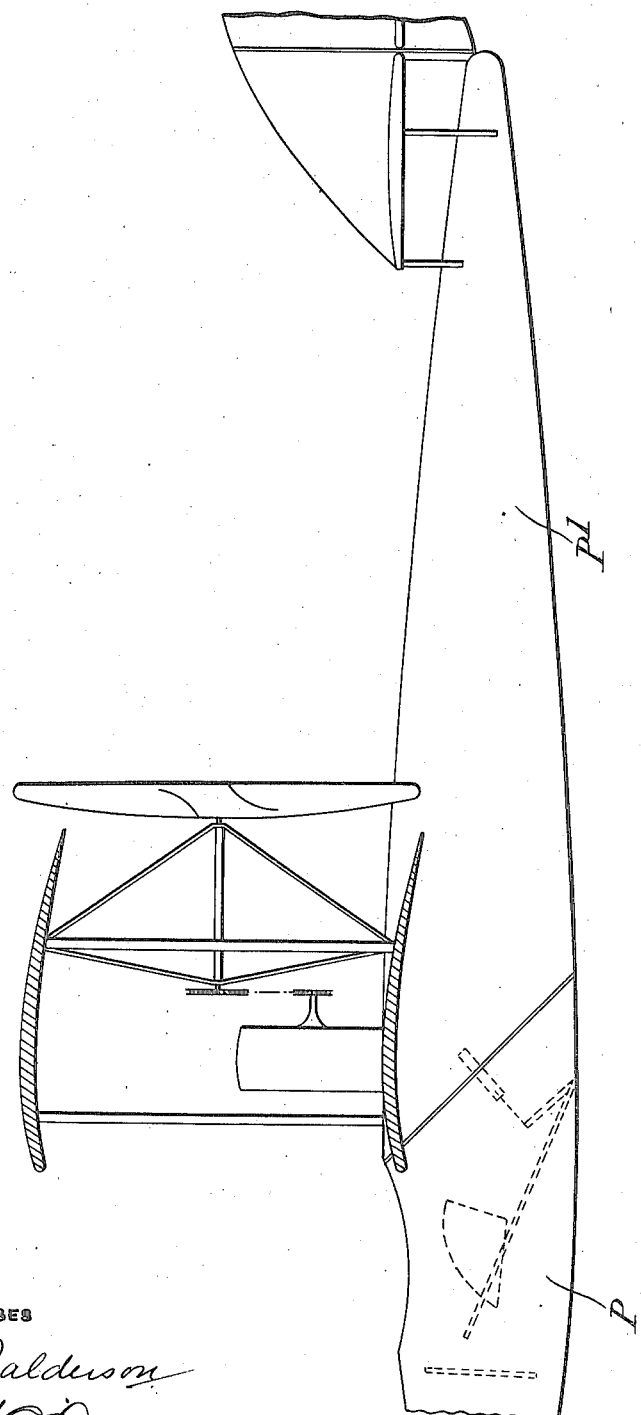

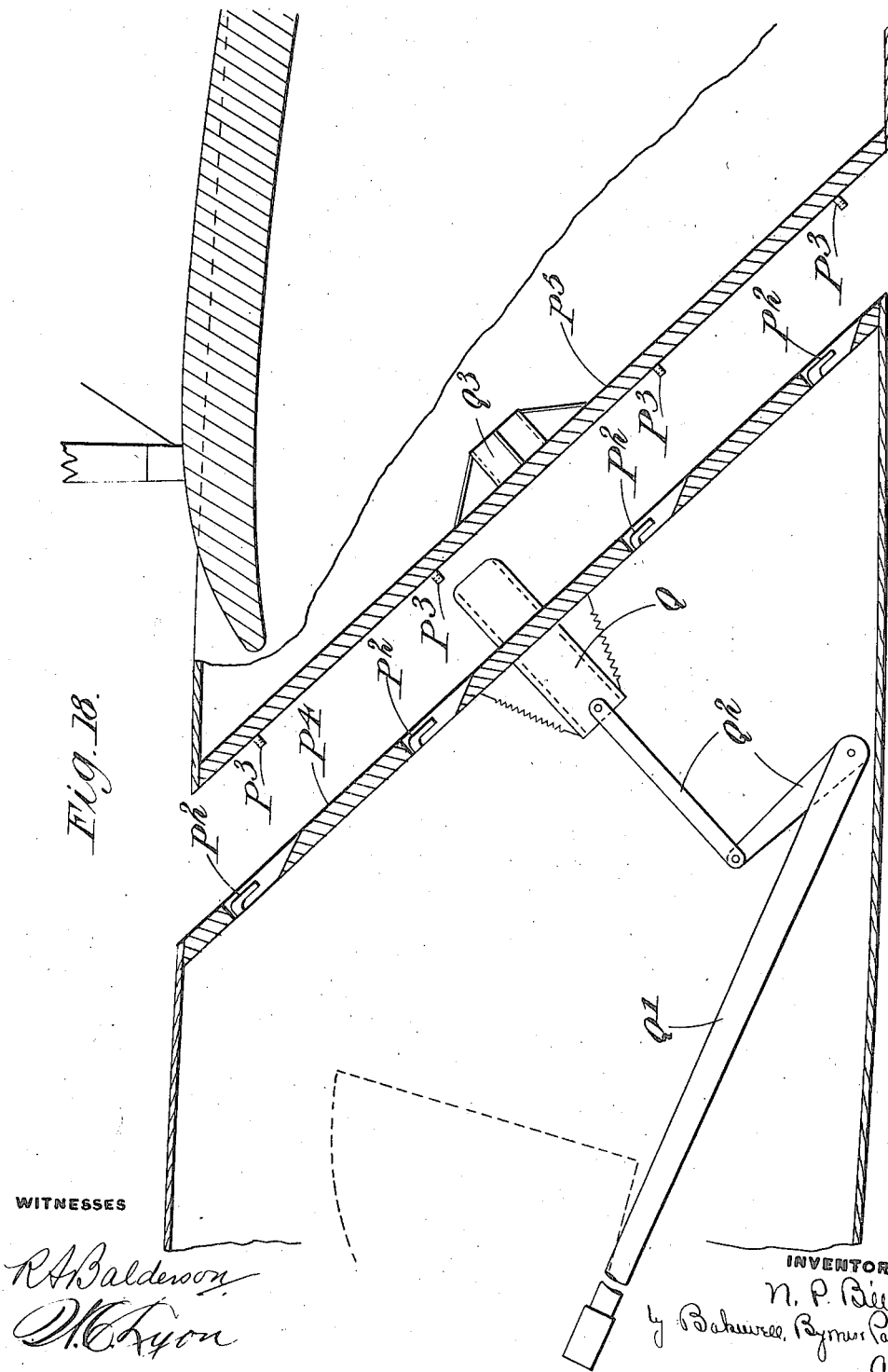

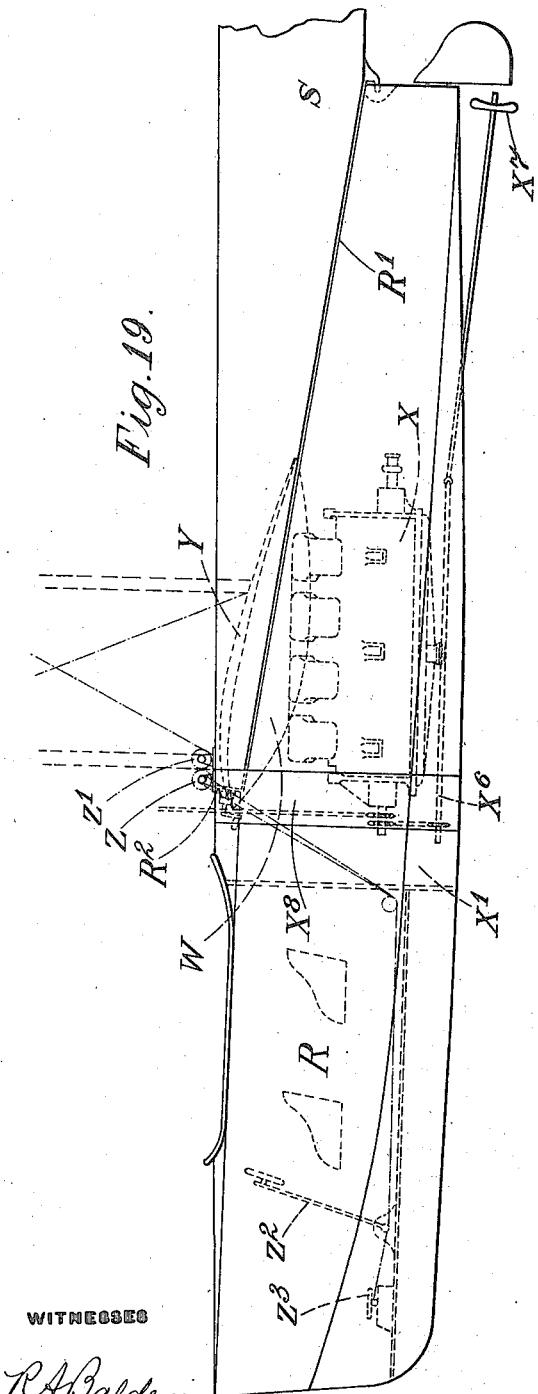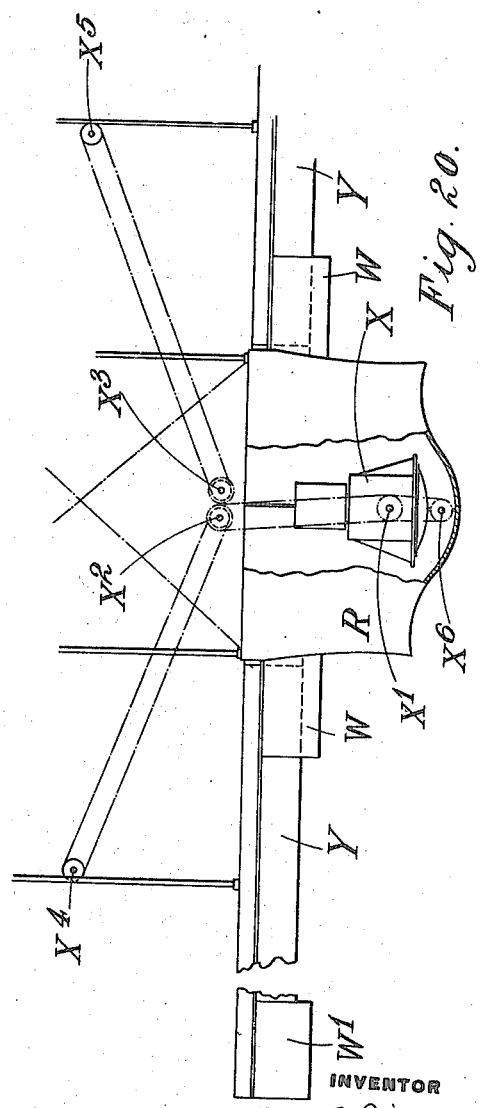

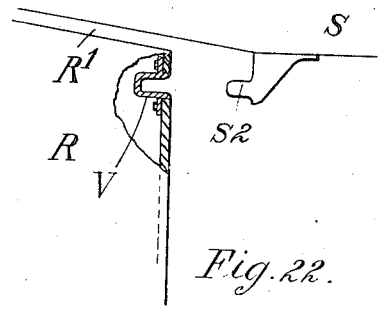
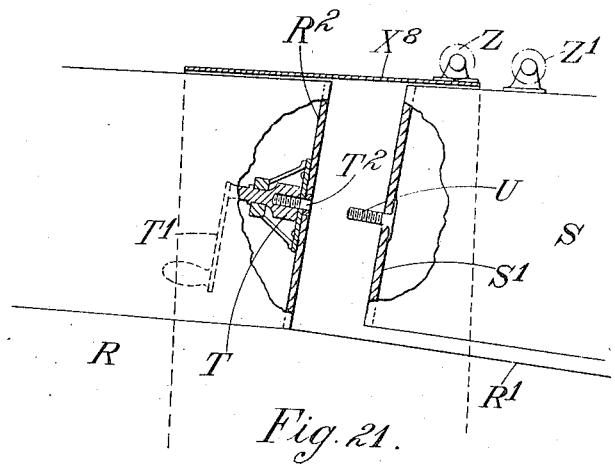

UNITED STATES PATENT OFFICE.

NOEL PEMBERTON BILLING, OF SOUTHAMPTON, ENGLAND.

FLYING-BOAT OR OTHER AERIAL CRAFT.

1,180,967.  Specification of Letters Patent.  Patented Apr. 25, 1916.

Application filed July 7, 1914. Serial No. 849,399.

*To all whom it may concern:*

Be it known that I, NOEL PEMBERTON BILLING, a subject of the King of England, residing at Southampton, Hampshire, England, have invented certain new and useful Improvements in Flying-Boats or other Aerial Craft, of which the following is a specification.

The present invention relates to improvements in flying boats or other aerial craft of the type known as "heavier than air" craft, that is to say, craft which do not normally depend mainly or entirely on the presence of balloons or gas-containing envelops for their buoyancy in air.

One of the objects of the present invention is, for example in the case of a flying boat, to render such craft safer during and after alighting by improving the stability of the remainder of the craft. When flying a boat alights upon a surface of water, for instance, it is liable to be considerably tossed about and possibly overturned by reason of the fact that its wings present a large surface to the action of the wind; further, if the sea is rough the crests of the waves are liable to strike the wings and so alter the balance of the craft considerably. Again, the moment that the floats touch the water a considerable friction is introduced which acts only upon the floats and not upon the wings and other superstructure so that the latter parts tend to tip forwardly and if there is a following wind, the forward tipping tendency of the wings may be dangerously accentuated. These disadvantages, in so far as they relate to the action of the wind upon the wings, and to the frictional resistance between the craft and the surface upon which it alights, apply equally to other aerial craft.

The invention is described as being applied to an aeroplane or hydroplane or flying boat although it is to be understood that where the body of such a craft is referred to, it is applicable to any convenient car or body or structure to which wings or supporting surfaces may be attached.

It is known that a construction of airship employing a balloon or gas-bag as its buoyant supporting member, has been suggested in which a boat-like car was attached to the balloon in such manner that it could be readily disconnected from its supports but the present invention does not include in any way air-ships of such a character, but as stated at the commencement of the specification relates only to air-ships of the "heavier than air" type.

According to the present invention a flying boat or other aerial craft has certain or all of its wings, or other devices used to support it in air, secured to the craft by a clutch or other releasing device and has also a lever or other operating member for the said clutch or device by which the aviator can, at will, detach the said parts, in order that, for example in the case of a flying boat, the stability of the remainder of the craft may be improved; in the case of a flying boat or airship car the boat will be left resting, without a dangerously large superstructure, on the surface upon which it alights. Thus, as the craft is alighting, the aviator can, if in his opinion the state of the wind or sea renders it necessary, detach the wings or other devices to bring about the above conditions. Preferably each detachable wing or the like or each group of wings or the like is provided with a separate detaching device and the detaching device of all the wings or the like or of all the wings or the like of a group are actuated by a single operating member.

In one construction included in the present invention, a flying boat or like aerial craft comprises a boat-hull and an aeroplane-portion which is separable from the boat-hull, is hollow at its forward end and is so shaped as to fit over and envelop the after portion of the boat-hull. The boat-hull is preferably cigar-shaped or is of stream-line formation while the body of the aeroplane-portion may conveniently constitute a sliding fit around a zone of the boat-hull just abaft of or approximately at the middle of the length of the boat-hull.

The invention also includes, as independent integers, the aeroplane-portion and the boat-portion respectively. Means are provided for quickly securing the two parts of the machine in their relative positions and also locking means securing the two parts so that the releasing mechanism cannot be operated when the craft is in flight.

These and other details of construction will be readily apparent from the following description taken in connection with the accompanying drawings which illustrate preferred embodiments of the invention.

Figure 2:
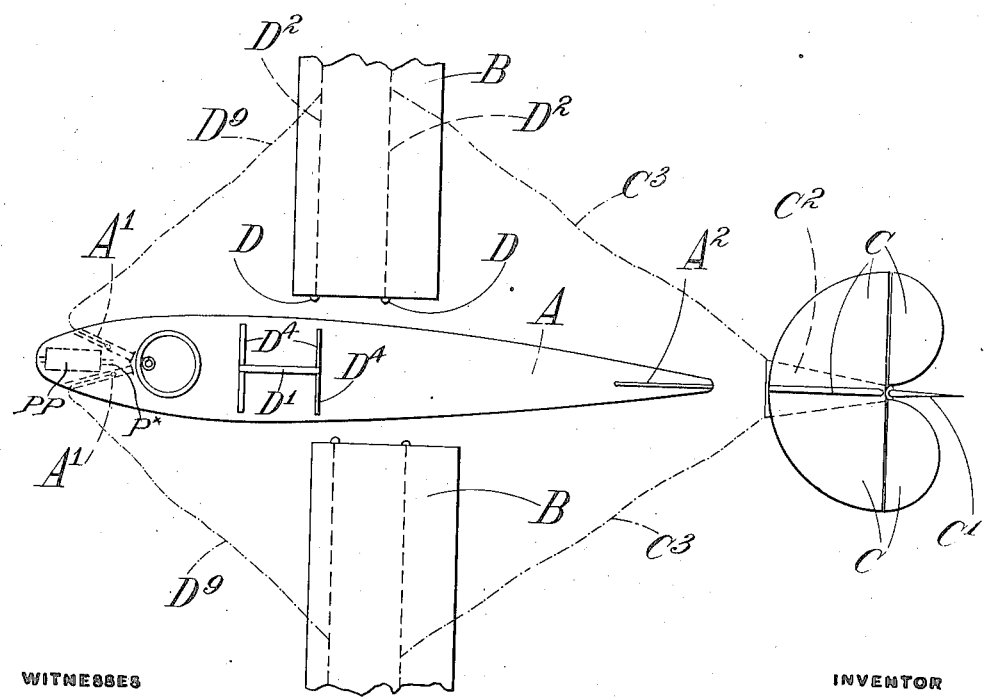
Figure 3:
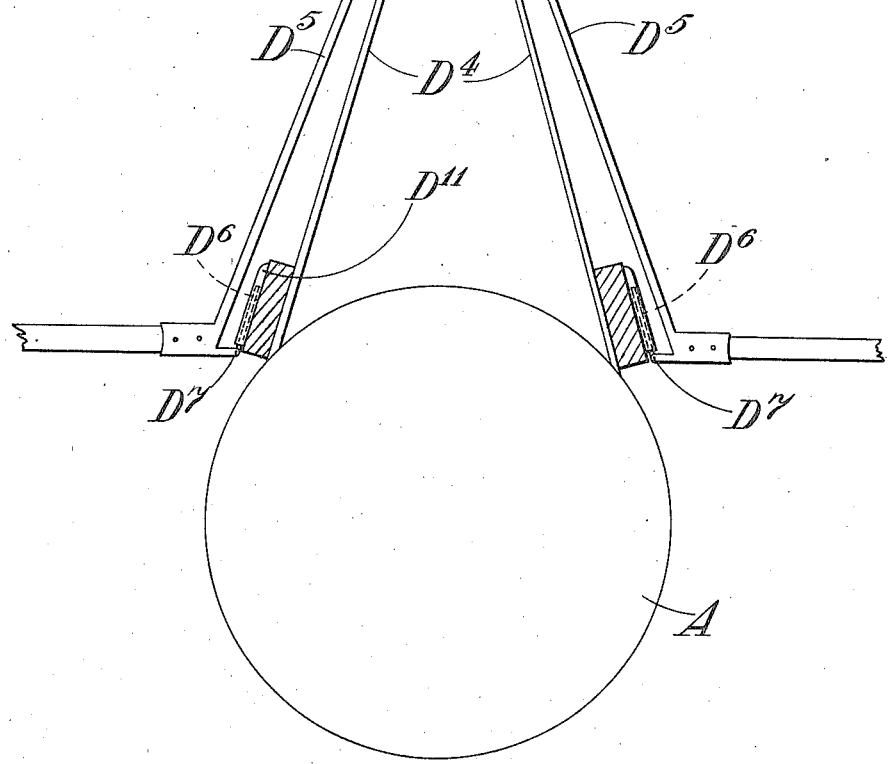
Figure 8:
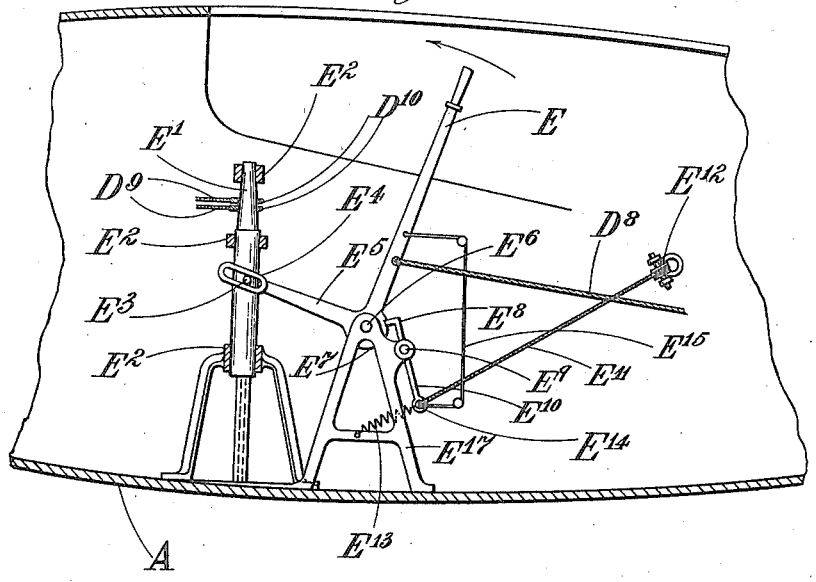
Figure 10:
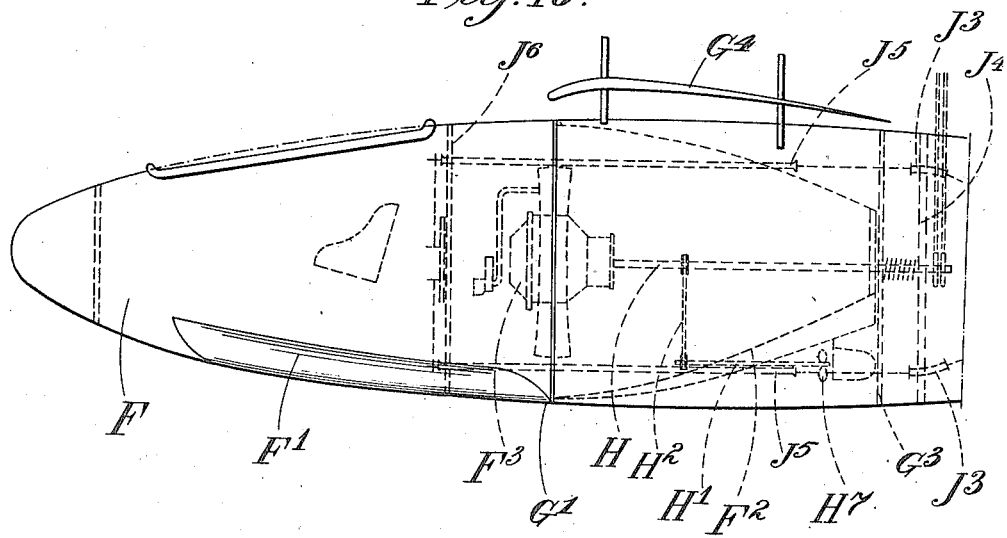
Figure 9:
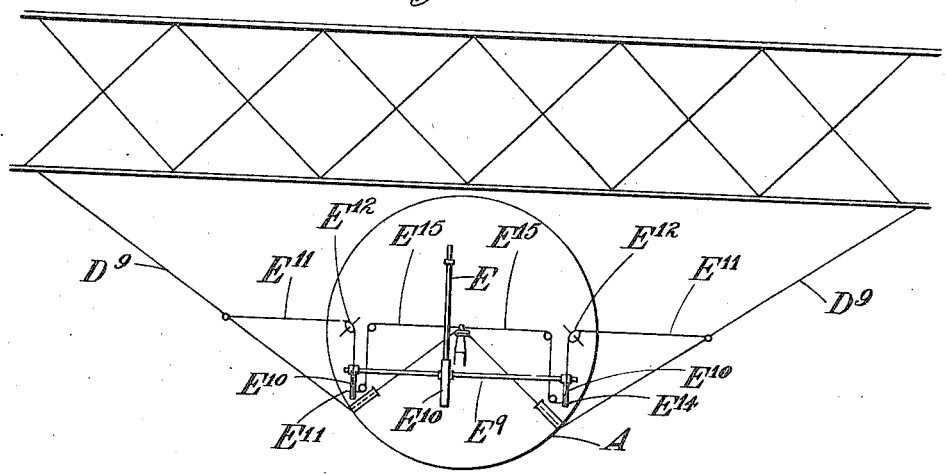
Figure 10:
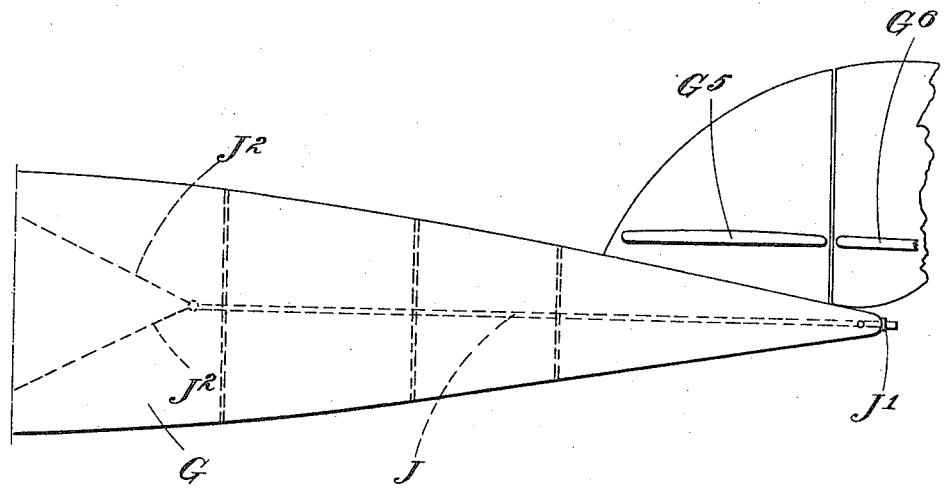
Figure 13:
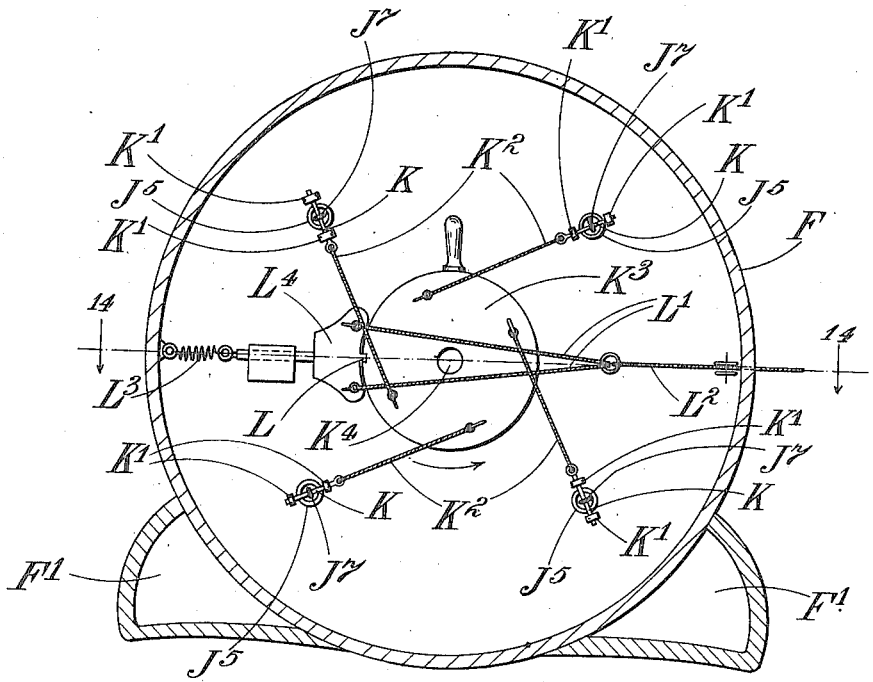
Figure 14:
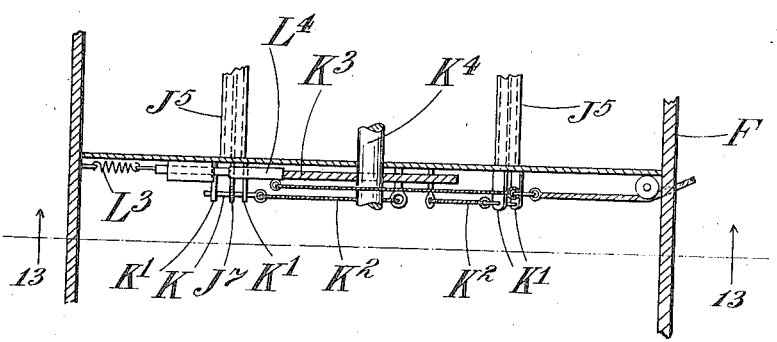

In the drawings—Figure 1 is a diagrammatic plan of an air-craft body and attaching mechanism for the wing-members; Fig. 2 illustrates diagrammatically the wing-members and tail-planes as they are leaving the body of the air-craft; Fig. 3 shows in enlarged detail the means for securing the main wings in position; Fig. 4 is an enlarged detail of means holding a wing spar in position; Fig. 5 is an end view from the right of Fig. 4; Fig. 6 shows the device illustrated in Fig. 4 in a position to free the wing spar; Fig. 7 is an end view from the right of Fig. 6; Fig. 8 shows means for securing the ends of the drift wires to hold the wings in place; Fig. 9 is a diagrammatic front view of the air-craft showing the attachments for the locking device to prevent accidental release of the wings while the air-craft is in flight; Figs. 10 and 10^A show diagrammatically, left and right halves, respectively, of another embodiment of the invention, in which the draft is composed of a separate boat hull and aeroplane-portion; Fig. 11 is a detail on an enlarged scale of the transom or stern of the boat-portion and its adjacent parts; Fig. 12 is a detail of the butt joint between the outer edges of the two portions of the craft; Fig. 13 shows, diagrammatically, means to lock the release mechanism employed in the construction shown in Fig. 10; Fig. 14 is a plan of Fig. 13; Fig. 15 is a diagrammatic elevation of a modified construction of craft; Fig. 16 is a detail on an enlarged scale of means of the attachment of the aeroplane-portion to the boat-portion; Fig. 17 shows diagrammatically a further modification of a construction in which a boat and an aeroplane-portion are provided as separate integers; Fig. 18 is a detail on an enlarged scale showing the means of connection between the two portions of the craft illustrated in Fig. 17; Fig. 19 is a partial assembly view, some of the parts having been removed, of another modification; Fig. 20 is an end view looking from the left of Fig. 19, parts having been broken away for the sake of clearness; Fig. 21 is a detail of construction showing one of the connections between the two portions of the craft, and Fig. 22 is a view of a detail of another connection for the two parts of the craft.

Like letters indicate like parts throughout the drawings.

Referring to Figs. 1-9, the body of the craft A is cigar-shaped or of stream-line formation and has side wings B, tail-planes C and rudder $C^1$. Means for attaching the wings in position are illustrated in detail in Figs. 3-7 and are described as applied to a biplane. The inner end of each top spar is provided with a jaw D adapted to receive a key $D^1$ which is in the form of a flattened bar extending a sufficient length longitudinally of the craft to engage the jaws on each of the two spars $D^2$, diagrammatically shown in Figs. 1 and 2. Secured to the key $D^1$ so as to be movable with it is a lever-arm $D^3$. The jaw D may be secured as a lug or cap fitting over the end of the spar or may be formed on the spar itself as a portion thereof. As shown diagrammatically in Fig. 3, the key $D^1$ is supported on a bracket $D^4$. The upper and lower spars are, at their inner ends, joined by struts $D^5$ and to the lower spars are attached pins $D^6$ hinged at $D^7$ and adapted to slide in tubular guides $D^{11}$ secured to the lower end of the supports $D^4$. When the key is in the position illustrated in Fig. 4, the jaws are locked to the supports $D^4$ and when the key has been moved to the position shown in Fig. 6 the jaws D can slide free of the key.

The lever-arm $D^3$ is connected by a wire or other connector $D^8$ with the lever E shown in Fig. 8, the function of which will be described hereinafter. Drift wires or stays $D^9$ connect the lower planes to the hull or body of the craft in the following manner:—Their inner ends pass through guide-tubes $A^1$ and terminate in loops or shackles of such a size that they will easily slide through the tubes $A^1$. The shackles are illustrated in Fig. 8 at $D^{10}$ and are shown in their fixed position as threaded over the end of a tapered sliding rod $E^1$ moving in guides or bearings $E^2$. Projecting from the rod $E^1$ is a pin $E^3$ engaged by a stirrup $E^4$ on the end $E^5$ of the bell-crank lever E $E^5$. The latter is pivotally mounted at $E^6$ in a bracket $E^{17}$. Operatively connected to and moving with the lever E is a sector $E^7$ having in it a notch or notches to be engaged by a pawl $E^8$ mounted on a shaft $E^9$. On the shaft $E^9$ are arms $E^{10}$ to which are secured wires or other connectors $E^{11}$ passing over guide-pulleys $E^{12}$ and connected, as shown in Fig. 9, to the drift wires $D^9$. Springs $E^{13}$ secured to the lever-arms $E^{10}$ normally tend to pull upon them to move the shaft $E^9$ so as to disengage the pawl $E^8$ from the notch in the sector $E^7$.

The tail-planes C and rudder $C^1$ are mounted on a separate cap $C^2$ which fits over the rear end of the body A and is provided with a key-way to engage a key $A^2$ on the craft so that when in position the cap $C^2$ is prevented from rotating on the craft about the longitudinal axis of the latter. The cap $C^2$ is held in place by wires or other connectors $C^3$ connected between the cap and the planes as shown in Figs. 1 and 2.

With the construction just described in connection with Figs. 1-9 it will be seen that when it is desired to release the wings, the lever E is moved in the direction of the arrow in Fig. 8 which withdraws the rod $E^1$ and releases the shackles $D^{10}$ and at the same time, by means of the connector $D^8$, moves the key $D^1$ to free the jaws D. The weight of the planes will draw the jaws from engagement with the key $D^1$, pivoting about the hinges $D^7$, and the pins $D^6$ will slide from their guide-supports on the frame $D^4$. The wires $D^9$ will draw out from the tubes $A^1$ freely and as the wings fall away from the craft the tail $C^2$ will also be removed with its attendant parts, as will be readily understood.

The wires or connectors $E^{11}$ which are secured to the drift wires $D^9$ hold the pawl $E^8$ tightly in engagement with the notch in the sector $E^7$ when the craft is in flight as, under these conditions, the drift wires $D^9$ will be in tension. It will be seen that during flight the locking device is operative to prevent the actuation of the detaching means but when at rest is inoperative or reversely operated so permitting the detachment of the wings or other supports. Thus, the lever E cannot be readily removed and in fact may be positively held from movement during the time that the craft is in flight. As soon, however, as the craft alights and the tension in the wires $D^9$ is slackened, the spring $E^{13}$ withdraws the pawl $E^8$ from engagement with the notch in the sector $E^7$ and the lever is free to release the parts as just described. Any convenient means may be employed to sever or disconnect the wires $E^{11}$ and this may be conveniently done by a pin or like connection $E^{14}$ for securing the wires $E^{11}$ to the lever $E^{10}$, which pin or connection is withdrawn by movement of the lever E through the medium of connecting wires or the like $E^{15}$, diagrammatically shown in Figs. 8 and 9. In place of the detent or pawl $E^8$ being held in place by the tension of the drift wires it could of course be normally held in place by means of a strong spring and released by connection with bracing wires or the like normally aiding in sustaining the weight of the planes when the craft is at rest. Such wires would come into operation to counteract the action of the spring when the craft has alighted on the surface on which it is to land. Alternatively, in place of the detent $E^8$ a foot-controlled detent or catch could be employed normally held by means of a spring or the like to arrest the movement of the lever E.

In Figs. 10–14 a modified construction according to the invention is illustrated and in this case there are provided, as two separate integers, a boat-hull F and an aeroplane-portion G. The boat is preferably of stream-line form as illustrated, and is provided with a step or shoe $F^1$ on that part of it in front of the aeroplane-portion and has a tapered tail-portion as shown in dotted lines at $F^2$. Within the boat-hull is an engine, diagrammatically shown at $F^3$, and a main shaft H extends rearwardly to be connected with the aeroplane-propellers in the manner described more fully hereinafter.

Connected with the main shaft H is a propeller-shaft $H^1$; the connection is conveniently a chain $H^2$ and spur-wheels or the like on the two shafts. Preferably a clutch is employed to maintain the shaft $H^1$ out of action until the required moment. The propeller carried on the end of the shaft $H^1$ is for operating only on water when the boat-portion alone is to be employed.

The aeroplane-portion comprises a hollow body structure referred to by the reference letter G, and is preferably circular in cross-section and at its forward end is of such a diameter as to slide over a small zone of the boat-hull and to abut, at $G^1$, against an annular flange on the boat-hull formed by the junction of the front and rear portions of the boat. This construction is illustrated more particularly in Fig. 12, in which is shown a packing ring $G^2$, made of rubber or other convenient packing material to form a water-tight joint, between the two portions of the craft.

The body of the aeroplane is continued in a tapered rearwardly extending portion of stream-line formation and is of such length that in conjunction with the forward portion of the boat-hull protruding beyond the aeroplane-hull the required over-all dimension of the aeroplane-body is obtained. Within the aeroplane-body just aft of the rearmost portion of the boat-hull when the parts are assembled is a water-tight bulk-head $G^3$, by which construction the whole of the body astern of the bulkhead is a water-tight buoyant compartment. The aeroplane-body supports the aeroplane-wings, one of which is shown at $G^4$, tail-pieces $G^5$ and rudders $G^6$ in any well-known convenient manner.

When the two portions F and G of the machine have been assembled (and when assembled they very much resemble a cigar held in a cigar-holder), they are held together in the following manner:—A wire or like connector J has one end secured at $J^1$ at the rear end of the aeroplane-hull and is provided, at that end, with an adjuster nut to regulate the tension. From the connector J four wires $J^2$ pass through guide-tubes $J^3$ in a bulkhead $J^4$ which is water-tight with the exception of the tubes and thence through the tubes $J^5$ in the boat-hull. The tubes $J^5$ at their forward ends pass through and open just beyond a water-tight bulkhead $J^6$. As shown more particularly in Fig 13, the wires $J^2$ terminate in loops or shackles $J^7$ which extend just clear of the end of the tubes $J^5$. Pins K sliding in guides $K^1$ are each connected by a thin rod or other connector $K^2$ to a disk $K^3$ rotatably mounted on a shaft $K^4$. The connectors $K^2$ are secured to the disk more or less tangentially so that by rotation of the disk the pins K will be withdrawn from the shackles $J^7$.

A catch or detent L projecting from a member L⁴ engages within a notch in the disk K³ and is normally held in engagement with the disk when the machine is in flight through the medium of a bridle L¹ and a connector L² secured to one of the drift wires or the like as illustrated in connection with the construction shown in Figs. 1–9. Any convenient means for example similar means to those described in connection with the construction shown in Figs. 1–9 may be employed for disconnecting the wire L² from the bridle L when it is desired to release the two portions of the craft. As in the previous example, the detent L is retracted by a spring L³ when the tension on the wire L² is removed but if desired the detent may be replaced by a foot-controlled or other detent or such a device may be omitted altogether either by the present modification or from the first described construction. The detent L may be connected with a wire which is slack when in flight but is in tension when the craft has alighted as suggested in connection with the first described embodiment of the invention. Other connectors for holding the two parts together may be employed if desired. For example, wires from the main planes may be brought down to the boat-hull and may be connected with a pin or other connector so that they can be slipped in the manner described in connection with Figs. 1–9 by movement of another lever or by suitable connection with the disk K³.

The engine F³ is preferably disposed in the boat-hull approximately amidships or at any other position which may be determined by the requisite balance of the craft. The axis of the driving shaft is generally coincident, or approximately so, with the axis of the craft and projects through a packed gland (not shown for the sake of clearness in the drawings) in the stern or transom F⁴ of the boat-hull. The portion of the shaft protruding through the boat-hull is formed with a squared end H³ and is received and supported in a bearing H⁴ in the bulkhead J⁴. The square end of the shaft passes through a similarly-shaped socket or hole in two chain-wheels H⁵ which, in their turn, drive chains connected with two aerial propellers disposed one on either side of the center line of the craft. Disposed between the transom F⁴ and the bulkhead J⁴ is a spring M which, when the parts are assembled, is normally compressed so that as soon as the wires J² are released the spring exerts a force to separate the two portions of the craft.

It will be readily understood that when it is desired to discard or do away with the aeroplane-portion and superstructure of the craft, it is only necessary to operate the disk or hand-wheel K³ to withdraw the pins K from the shackles J⁷ when the wires J² will be released and will be drawn through the tubes J⁵ and J³ while the shaft will draw out from the chain-wheels H⁵ as will be readily understood. Preferably between the chain-wheels H⁵ and the shaft H³ is a sleeve H⁶ which is shaped to coöperate with the shaft H and is held in the bearings H⁴ and supports the wheels H⁵. When the two parts have been separated the boat-portion may move away and is driven by the propeller H⁷ on the shaft H¹, the clutch for that shaft having been put into operation by the aviator.

Although the invention has been described in detail in connection with the accompanying drawings, it is not limited to the details illustrated therein and modifications may be made provided that the spirit of the invention is not departed from. For example, the space bounded by the rearward portion of the boat-hull, the forward portion of the aeroplane body and the bulkhead within the aeroplane-body may, if desired, form a receptacle for a hydrogen bag or bags containing gas under pressure so that when the two portions of the craft are separated the hydrogen may expand and fill the forward space of the body-portion of the aeroplane.

It is within the invention to divide the power plant, having one unit in the boat-hull and another unit in the body of the aeroplane-portion, the two power units being interconnected in any convenient manner.

Where the power-shaft extends through its bearing in the bulkhead in the body portion of the aeroplane the bearing may be covered by a leather or other water-tight hood so that the bearing orifice shall not destroy the water-tight characteristic of the rearward portion of the body of the aeroplane-portion. Further, if the craft is provided with separate steering wings it may be desired to retain these and in this case only the other wings would be detached, preferably in the manner illustrated in Figs. 1–9. If the machine be a biplane it may be considered desirable to detach only a certain section of the planes and it is contemplated, according to the present invention, that any group or groups of planes may be arranged to be simultaneously detached.

With the construction illustrated in Figs. 10–14, it will be seen that the aerial propellers are discarded together with the wing-surfaces and if desired a power plant, as has already been stated, may be included in the aeroplane-portion and may be discarded with it.

A further modified construction is shown in connection with Figs. 15 and 16 in which the boat-portion O is constructed as a hydroplane or skimming boat, and has secured to it an aeroplane-portion denoted generally by the reference letter $O^1$ on which the supporting planes $O^2$ are built up in the usual manner and have extending rearwardly from them a fuselage $O^3$ conveniently of girder-like construction. Secured to the lower plane (or if it be divided at its junction with the boat-body then secured to the inner ends of the lower planes) is a saddle $O^4$ which fits over the after portion of the hull of the boat O. The saddle $O^4$ and aeroplane-portion $O^1$ with its attendant parts are held to the craft by means similar in their arrangement to those described for holding the wings in place in the construction illustrated in Figs. 1 to 9; that is to say, as shown more particularly in Fig. 16 a key $O^5$ extends through jaws $O^6$ at the extremities of arms $O^7$ disposed on either side of the boat-hull; also by means of a sliding pin-connection at or near the opposite edge of the plane and shown as a pin $O^8$ pivoted at $O^9$ and adapted to slide in a guide $O^{10}$.

Conveniently drift wires (not shown in the drawings) are secured between the aeroplane-portion and the boat-hull in a similar manner to that described in connection with Figs. 1 to 9 and these wires are released as the key $O^5$ is operated to release the jaws $O^6$ by the movement of a single lever as was the case with the construction illustrated in Figs. 1 to 9.

In Figs. 17 and 18 a further modification is described in which the hull of the craft is substantially cigar-shaped or of a stream-line formation and is in two portions, the forward portion constituting a boat-hull and the after portion constituting a support for the aeroplane wings and tail-pieces. Thus the boat-portion is shown at P and the body of the aeroplane-portion at $P^1$. These parts are secured together as shown in Fig. 18 by means of pins $P^2$ secured on the sloping rear end of the boat-portion and adapted to engage with eyebolts $P^3$ on the correspondingly sloped forward end of the aeroplane-portion. When the pins $P^2$ and eyebolts $P^3$ have been engaged and the two portions of the craft are in their correct relative positions a hollow centralizing and locking pin Q conveniently mounted for axial movement in the rear end of the boat-portion is moved by the lever-connections $Q^1$, $Q^2$ to pass into a guide or recess $Q^3$ provided at the forward end of the aeroplane-hull.

Pins $P^2$ are mounted in a bulkhead $P^4$, which may be provided with an interior bulkhead to form a water-tight construction while the eyebolts are mounted in a bulkhead $P^5$ in the aeroplane-portion. The bulkheads are, as will readily be understood, slotted or bored to enable the pin Q, which is preferably hollow as illustrated, to pass through them and into the guide $Q^3$.

As in the previous constructions drift wires may be employed between the aeroplane-portion and the boat-hull and such drift wires may be released by movement of the lever $Q^1$, as it is operated to remove the pin Q from the guide or socket $Q^3$.

In both the constructions illustrated in Figs. 15 to 18 the details may be varied to suit requirements to be met with in practice provided that the spirit of the invention is not departed from.

In Figs. 19-22 the boat is shown at R while of the aeroplane-body the forward part is shown at S. It terminates toward the rear with the customary body, tail-planes, elevators and rudders as is usual in such craft. The rear portion of the boat is inclined as at $R^1$ and on this rear portion the forward portion of the aeroplane-body fits and abuts against an offset or projection $R^2$ on the boat-portion. The projection $R^2$ is shown more clearly in Fig. 21, in which figure is also shown part of the means for holding the two parts of the craft together. On the projection $R^2$ is mounted, in suitable supports, a nut T which is rotated in its bearings by a crank-handle $T^1$. The nut is in register with a hole $T^2$ formed in the partition or projecting portion $R^2$ and is adapted to receive a bolt U secured to and projecting from the forward bulkhead $S^1$ of the aeroplane-portion S.

In the transom or stern of the boat-portion is a socket V (Fig. 22) suitably held in place and strengthened as required, which is adapted to receive a pin or connector $S^2$ which is rigidly secured to the aeroplane-portion. A metal band or strap $X^3$, as shown in Fig. 21, surrounds the junction between the parts $R^2$ and $S^1$ to further strengthen the connection. To the wing-frame of the aeroplane-portion are attached floats W which fit closely to and co-act with the sloping sides of the boat-hull R to aid in further holding the parts together. Thus, to assemble the parts, the two portions are approached toward one another until the forward portion of the aeroplane-body rests upon the inclined portion at the rear of the boat-hull. The bolt U is engaged by the nut T which is then rotated by the crank-handle $T^1$ to draw the parts tightly together and during this operation the pin $S^2$ engages in the socket V and the floats W slide in on either side against the side of the boat-hull R and the connection between the two portions is complete.

An engine X has suitable connections between its shaft $X^1$ and countershafts $X^2$ and $X^3$, which latter are geared to propeller shafts $X^4$ and $X^5$ for driving the craft when in air. Thus a chain-connection may be provided between a chain-wheel fast on the shaft $X^1$ and a chain-wheel which engages the shaft $X^2$. For this purpose the latter chain-wheel may be journaled in suitable bearings provided on the boat and the shaft $X^2$, mounted in bearings on the aeroplane-body may have with the chain-wheel a castellated or sliding coupling. The shaft $X^1$ is also geared with a propeller shaft $X^6$ which drives a water-propeller $X^7$ to propel the whole craft or boat-portion only when it is on the surface of the water. The craft may have any suitable number of wings or aeroplane-surfaces and in the construction illustrated only the lower wings Y of a biplane construction are shown in detail.

For the purpose of operating the necessary controls gear-wheels Z are mounted on a part connected with the boat-body and are adapted to mesh with other gear-wheels $Z^1$ mounted upon the aeroplane-hull when the parts are in their assembled position. The gear-wheels Z are operated from control levers of any convenient type, such for example as those illustrated diagrammatically at $Z^2$ $Z^3$ while the gear-wheels $Z^1$ are in connection with, and operate the several parts such as the wings, rudder, elevator, etc.

In the other constructions illustrated similar operative connections between the control levers and the various wing-surfaces or other controlling means operated by the control levers may be employed.

It will be readily understood that when it is required to separate the two portions of the craft all that is necessary is to rotate the nut T by means of the crank-handle $T^1$ to release it from the bolt U when the two parts of the craft are at once free from one another and the boat R can be propelled by the propeller $X^7$ away from the aeroplane-portion.

Floats are preferably provided at or near the lower wing-tips, as shown diagrammatically at $W^1$ so that the aeroplane-portion will float as a whole evenly on the surface of the water when it has been released from or discarded from the boat.

What I claim as my invention and desire to secure by Letters Patent is:—

1. A heavier-than-air aerial craft, comprising a combined boat and car portion, and a separable plane carrying portion, rigid but detachable connections between the two portions, and means whereby said connections can be detached at will by an operator in the combined boat and car portion, substantially as described.

2. A heavier-than-air aerial craft, comprising a combined boat and car portion having a power plant therein, a separable plane carrying portion, rigid but detachable connections between the two portions, and detaching means whereby an operator in the combined boat and car portion may disconnect said portions at will without losing control of the power plant, substantially as described.

3. An aerial craft comprising in combination a boat, a complete aeroplane-structure which is adapted to be mounted upon a portion of the boat-hull and is separable therefrom, positioning means to locate the aeroplane-portion on the boat-hull, means to secure together the boat and the aeroplane-structure and means operable at will by the aviator to release the said securing means to separate the boat and the aeroplane-structure.

4. An aerial craft comprising in combination, a boat, a complete aeroplane-structure separable from the boat, an offset on the body of the boat-hull to engage the forward end of the aeroplane-structure, means to secure together the boat and the aeroplane-structure, and means operable at will by the aviator to release the said securing means to separate the boat and the aeroplane-structure.

5. An aerial craft comprising in combination, a boat, a complete aeroplane structure adapted to be mounted upon a portion of the boat-hull and separable therefrom, an offset on the body of the boat-hull to engage the forward end of the aeroplane-structure, means to secure together the boat and the aeroplane-structure and means operable at will by the aviator to release the said securing means to separate the boat and the aeroplane-structure.

6. An aerial craft comprising in combination, a boat, a complete aeroplane-structure adapted to be mounted upon a portion of the boat-hull and separable therefrom, positioning means to locate the aeroplane-portion on the boat-hull, an offset on the body of the boat-hull to engage the forward end of the aeroplane-structure, means to secure together the boat and the aeroplane-structure and means operable at will by the aviator to release the said securing means to separate the boat and the aeroplane-structure.

7. An aerial craft comprising in combination, a boat-hull having its rear portion inclined to the longitudinal axis of the craft, a complete aeroplane-structure separable therefrom and having its forward end inclined to correspond with the inclination of the rear portion of the boat-hull and to contact therewith, means to secure together the boat and the aeroplane-structure, and means operable at will by the aviator to release the said securing means to separate the boat and the aeroplane-structure.

8. An aerial craft comprising in combination, a boat-hull having its rear portion inclined to the longitudinal axis of the craft, a complete aeroplane-structure separable therefrom and having its forward end inclined to correspond with the inclination of the rear portion of the boat-hull and to contact therewith, positioning means to locate the aeroplane-portion on the boat-hull, means to secure together the boat and aeroplane-structure and means operable at will by the aviator to release the said securing means to separate the boat and the aeroplane-structure.

9. An aerial craft comprising in combination, a boat-hull having its rear portion inclined to the longitudinal axis of the craft, a complete aeroplane-structure separable therefrom and having its forward end inclined to correspond with the inclination of the rear portion of the boat-hull and to contact therewith, an offset on the body of the boat-hull to engage the forward end of the aeroplane-structure, means to secure together the boat and aeroplane-structure and means operable at will by the aviator to release the said securing means to separate the boat and the aeroplane-structure.

10. An aerial craft comprising in combination, a boat-hull having its rear portion inclined to the longitudinal axis of the craft, a complete aeroplane-structure separable therefrom and having its forward end inclined to correspond with the inclination of the rear portion of the boat-hull and to contact therewith, an offset on the body of the boat-hull to engage the forward end of the aeroplane-structure, positioning means to locate the aeroplane-portion on the boat-hull, means to secure together the boat and aeroplane-structure and means operable at will by the aviator to release the said securing means to separate the boat and the aeroplane-structure.

11. An aerial craft comprising in combination, a boat, a complete aeroplane-structure which is separable from the boat and whose forward portion is adapted to overlie the rearward portion of the boat-hull, an offset on the boat-hull to engage the forward end of the aeroplane-structure, a tensioning device to draw the forward end of the aeroplane-structure tightly against the said offset, holding devices between the stern of the boat and the aeroplane-structure, positioning means on the aeroplane-structure to locate it on the boat-hull and means operable by the aviator at will to release the said tensioning device.

12. An aerial craft comprising in combination, a boat, a complete aeroplane-structure which is separable from the boat and whose forward portion is adapted to overlie the rearward portion of the boat-hull, the contacting surfaces between the boat and aeroplane-structure being correspondingly inclined downwardly toward the stern of the boat, an offset on the boat-hull to engage the forward end of the aeroplane-structure, a tensioning device to draw the forward end of the aeroplane-structure tightly against the said offset, holding devices between the stern of the boat and the aeroplane-structure, positioning means on the aeroplane-structure to locate it on the boat-hull and means operable by the aviator at will to release the said tensioning device.

13. An aerial craft comprising in combination, a boat, a complete aeroplane-structure which is separable from the boat and whose forward portion is adapted to overlie the rearward portion of the boat-hull, an offset on the boat-hull to engage the forward end of the aeroplane-structure, a tensioning device to draw the forward end of the aeroplane-structure tightly against the said offset, holding devices between the stern of the boat and the aeroplane-structure, guides projecting downwardly from the aeroplane-structure to engage on either side of the boat-hull, and means operable by the aviator at will to release the said tensioning device.

14. An aerial craft comprising in combination, a boat, a complete aeroplane-structure which is separable from the boat and whose forward portion is adapted to overlie the rearward portion of the boat-hull, an offset on the boat-hull to engage the forward end of the aeroplane-structure, a tensioning device to draw the forward end of the aeroplane-structure tightly against the said offset, holding devices between the stern of the boat and the aeroplane-structure, floats depending downwardly from the aeroplane-structure and adapted to engage on either side of the boat-hull, and means operable by the aviator at will to release the said tensioning device.

15. An aerial craft comprising in combination, a boat, a complete aeroplane-structure which is separable from the boat and whose forward portion is adapted to overlie the rearward portion of the boat-hull, an offset on the boat-hull to engage the forward end of the aeroplane-structure, a tensioning device to draw the forward end of the aeroplane-structure tightly against the said offset, holding devices between the stern of the boat and the aeroplane-structure, floats depending downwardly from the aeroplane-structure and adapted to engage on either side of the boat-hull, the contacting surfaces of the floats and boat-hull being inclined to form a locking connection against separation of the two parts in a vertical direction, and means operable by the aviator at will to release the said tensioning device.

16. An aerial craft comprising in combination, a boat, a complete aeroplane-structure which is separable from the boat and whose forward portion is adapted to overlie the rearward portion of the boat-hull, the contacting surfaces between the boat and aeroplane-structure being correspondingly inclined downwardly toward the stern of the boat, an offset on the boat-hull to engage the forward end of the aeroplane-structure, a tensioning device to draw the forward end of the aeroplane-structure tightly against the said offset, holding devices between the stern of the boat and the aeroplane-structure, guides projecting downwardly from the aeroplane-structure to engage on either side of the boat-hull, and means operable by the aviator at will to release the said tensioning device.

17. An aerial craft comprising in combination, a boat, a complete aeroplane-structure which is separable from the boat and whose forward portion is adapted to overlie the rearward portion of the boat-hull, the contacting surfaces between the boat and aeroplane-structure being correspondingly inclined downwardly toward the stern of the boat, an offset on the boat-hull to engage the forward end of the aeroplane-structure, a tensioning device to draw the forward end of the aeroplane-structure tightly against the said offset, holding devices between the stern of the boat and the aeroplane-structure, floats depending downwardly from the aeroplane-structure and adapted to engage on either side of the boat-hull, and means operable by the aviator at will to release the said tensioning device.

18. An aerial craft comprising in combination, a boat, a complete aeroplane-structure which is separable from the boat and whose forward portion is adapted to overlie the rearward portion of the boat-hull, the contacting surfaces between the boat and aeroplane-structure being correspondingly inclined downwardly toward the stern of the boat, an offset on the boat-hull to engage the forward end of the aeroplane-structure, a tensioning device to draw the forward end of the aeroplane-structure tightly against the said offset, holding devices between the stern of the boat and the aeroplane-structure, floats depending downwardly from the aeroplane-structure and adapted to engage on either side of the boat-hull, the contacting surfaces of the floats and boat-hull being inclined to form a locking connection against separation of the two parts in a vertical direction, and means operable at will by the aviator to release the said tensioning device.

19. An aerial craft comprising in combination, a boat, a complete aeroplane-structure which is separable from the boat and whose forward portion is adapted to overlie the rearward portion of the boat-hull, an offset on the boat-hull to engage the forward end of the aeroplane-structure, a tensioning device comprising a rotary nut and screw-connection between the boat and aeroplane-structure to draw the forward end of the latter tightly against the offset on the boat, holding devices between the stern of the boat and the aeroplane-structure, positioning means on the aeroplane-structure to locate it on the boat-hull, and means operable by the aviator at will to release the said tensioning device.

20. An aerial craft comprising in combination, a boat, a complete aeroplane-structure which is separable from the boat and whose forward portion is adapted to overlie the rearward portion of the boat-hull, the contacting surfaces between the boat and aeroplane-structure being correspondingly inclined downwardly toward the stern of the boat, an offset on the boat-hull to engage the forward end of the aeroplane-structure, a tensioning device comprising a rotary nut and screw-connection between the boat and aeroplane-structure to draw the forward end of the latter tightly against the offset on the boat, holding devices between the stern of the boat and the aeroplane-structure, positioning means on the aeroplane-structure to locate it on the boat-hull, and means operable by the aviator at will to release the said tensioning device.

In testimony whereof I have signed my name to this specification in the presence of two subscribing witnesses.

NOEL PEMBERTON BILLING.

Witnesses:
 HARVEY J. BAVERSTOCK,
 C. GACK.